(12) United States Patent
Kobayashi et al.

(10) Patent No.: US 11,006,015 B2
(45) Date of Patent: May 11, 2021

(54) INFORMATION PROCESSING APPARATUS AND NON-TRANSITORY COMPUTER READABLE MEDIUM STORING INFORMATION PROCESSING PROGRAM

(71) Applicant: FUJI XEROX CO., LTD., Tokyo (JP)

(72) Inventors: Kunihiko Kobayashi, Kanagawa (JP); Junichi Shimizu, Kanagawa (JP); Daigo Horie, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/531,119

(22) Filed: Aug. 4, 2019

(65) Prior Publication Data
US 2020/0236243 A1 Jul. 23, 2020

(30) Foreign Application Priority Data
Jan. 17, 2019 (JP) .............. JP2019-006192

(51) Int. Cl.
*H04N 1/00* (2006.01)
*G06K 9/34* (2006.01)
*G06K 9/00* (2006.01)

(52) U.S. Cl.
CPC ..... *H04N 1/00923* (2013.01); *G06K 9/00469* (2013.01); *G06K 9/344* (2013.01); *H04N 1/00331* (2013.01)

(58) Field of Classification Search
CPC ........... H04N 1/00923; H04N 1/00331; G06K 9/00469; G06K 9/344; G06K 9/00463; G06K 9/2081; G06K 9/2063; G06K 2209/01; G06K 9/00449
See application file for complete search history.

(56) References Cited

U.S. PATENT DOCUMENTS

| | | | |
|---|---|---|---|
| 2018/0232573 A1* | 8/2018 | Yamazaki | G06K 9/00463 |
| 2019/0068551 A1* | 2/2019 | Bilsten | G06F 16/955 |
| 2019/0132475 A1* | 5/2019 | Hirota | H04N 1/32101 |

FOREIGN PATENT DOCUMENTS

JP 2018-128996 8/2018

* cited by examiner

*Primary Examiner* — Iriana Cruz
(74) *Attorney, Agent, or Firm* — JCIPRNET

(57) ABSTRACT

An information processing apparatus includes a setting unit that, in a case where plural keyword candidates representing information on an acquisition target are included in a document, sets a target keyword from the keyword candidates in accordance with priority information of defining a keyword to be preferentially used as the target keyword representing an item of the information on the acquisition target among the keyword candidates, an extraction unit that extracts a character string corresponding to the target keyword set by the setting unit, from the document, and an output unit that outputs the character string corresponding to the target keyword, which is extracted by the extraction unit.

22 Claims, 9 Drawing Sheets

30

| INFORMATION NUMBER | CONDITION | KEYWORD |
|---|---|---|
| 1 | [NUMBER] [No] [Number] | NUMBER |
| 2 | [No] [ESTIMATE SHEET NUMBER] | ESTIMATE SHEET NUMBER |
| . . . | . . . | . . . |

FIG. 2

```
No    A123
ESTIMATE SHEET NUMBER   123-456
                            .
                            .
```
— 20

| INFORMATION NUMBER | CONDITION | KEYWORD |
|---|---|---|
| 1 | [NUMBER]<br>[No]<br>[Number] | NUMBER |
| 2 | [No]<br>[ESTIMATE SHEET NUMBER] | ESTIMATE SHEET NUMBER |
| ⋮ | ⋮ | ⋮ |

FIG. 6A
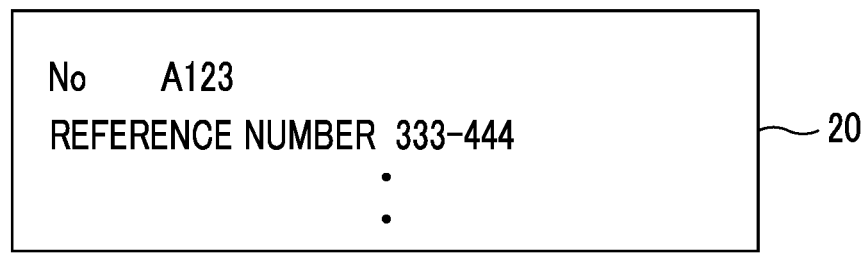
FIG. 6B
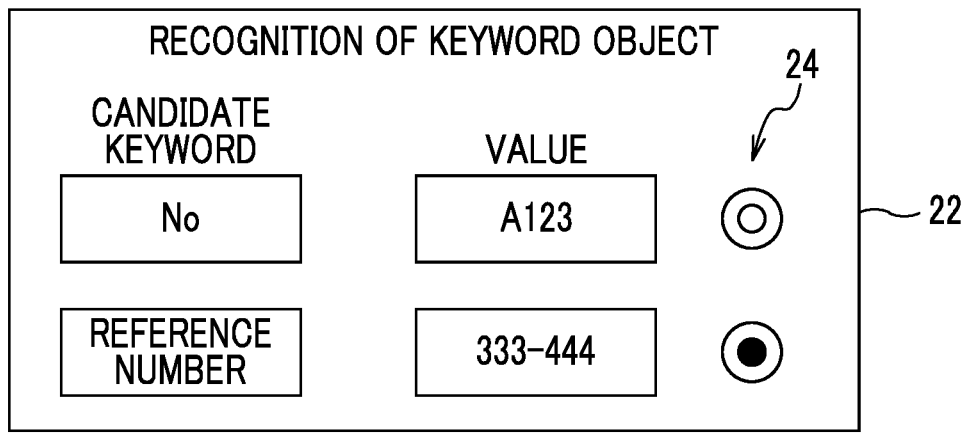
FIG. 6C
| INFORMATION NUMBER | CONDITION | KEYWORD |
|---|---|---|
| 1 | [NUMBER]<br>[No]<br>[Number] | NUMBER |
| 2 | [No]<br>[ESTIMATE SHEET NUMBER] | ESTIMATE SHEET NUMBER |
| 3 | [No]<br>[REFERENCE NUMBER] | RFERENCE NUMBER |
| : | : | : |

| INFORMATION NUMBER | CONDITION | KEYWORD |
|---|---|---|
| 1 | [NUMBER] [10,10,20,10]<br>[No] [10,30,15,10]<br>[Number] [80,120,30,10] | NUMBER |
| 2 | [No] [10,10,15,10]<br>[ESTIMATE SHEET NUMBER] [10,25,40,10] | ESTIMATE SHEET NUMBER |
| 3 | [No] [10,10,15,10]<br>[ESTIMATE SHEET NUMBER] [40,25,40,10] | No |
| ⋮ | ⋮ | ⋮ |

FIG. 11A
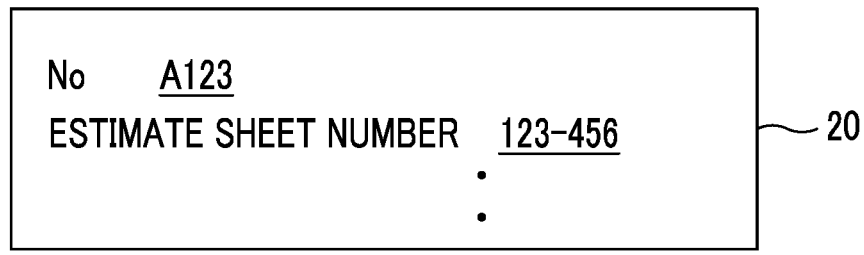
FIG. 11B
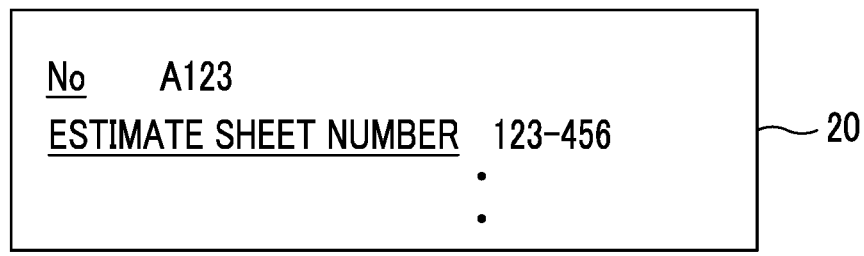
FIG. 11C
| INFORMATION NUMBER | CONDITION | KEYWORD |
|---|---|---|
| 1 | [No] [Value = under]<br>[ESTIMATE SHEET NUMBER] [Value = under] | ESTIMATE SHEET NUMBER |
| 2 | [No] [Key = under]<br>[ESTIMATE SHEET NUMBER] [Key = under] | No |
| ⋮ | ⋮ | ⋮ |

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2019-006192 filed Jan. 17, 2019.

BACKGROUND

(i) Technical Field

The present invention relates to an information processing apparatus and a non-transitory computer readable medium storing an information processing program.

(ii) Related Art

An information processing apparatus that extracts a character string associated with an item represented by a specific keyword desired by a user from a document image read by a scanner is known.

JP2018-128996A discloses an information processing apparatus including an extraction section that extracts a region by performing region analysis processing on an image, acquisition section that acquires a rule for extracting a specific keyword and a value corresponding to the keyword, a determination section that determines an order for specifying the region including the keyword and the region including the value corresponding to the keyword by using the rule, in accordance with values allowed to be taken by the keyword and the value corresponding to the keyword included in the rule, a specifying section that specifies the region including the keyword or the region including the value corresponding to the keyword from the extracted region in accordance with the determined order, and a character recognition section that performs character recognition processing on the specified region. The specifying section specifies the other corresponding region based on the previously-specified region, in accordance with the determined order.

SUMMARY

In a case where the notation of an item representing information desired by a user is predetermined, a character string associated with a keyword is extracted from a document by setting the determined notation as the keyword.

However, for example, in a case where the creation source of the document differs, a document may be created by using a different keyword even though the same item is provided. Even in such a case, in order to extract a character string associated with a desired item from a document, a character string associated with a candidate for each keyword may be extracted by using a plurality of candidates for the keyword considered to be used in the notation of the desired item.

However, determination of which character string is associated with a desired item, in a case where a character string associated with a candidate for each keyword is extracted by using a plurality of candidates for the keyword, is not provided.

Aspects of non-limiting embodiments of the present disclosure relate to an information processing apparatus and an information processing program in which, even in a case where a plurality of candidates for a keyword indicating an item of information to be acquired is provided in a document, it is possible to specify any one keyword indicating the item of the information to be acquired is specified among a plurality of keywords, and to output a character string corresponding to the specified keyword.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a setting unit that, in a case where a plurality of keyword candidates representing information on an acquisition target are included in a document, sets a target keyword from the keyword candidates in accordance with priority information of defining a keyword to be preferentially used as the target keyword representing an item of the information on the acquisition target among the keyword candidates, an extraction unit that extracts a character string corresponding to the target keyword set by the setting unit, from the document, and an output unit that outputs the character string corresponding to the target keyword, which is extracted by the extraction unit.

BRIEF DESCRIPTION OF THE DRAWINGS

Exemplary embodiment(s) of the present invention will be described in detail based on the following figures, wherein:

FIG. 2 is a diagram illustrating an example of a document;

FIG. 3 is a diagram illustrating an example of priority information;

FIGS. 6A to 6C are diagrams illustrating display examples of a section screen;

FIGS. 11A to 11C are diagrams situations in a case where a character attribute is used in format information set for the priority information.

DETAILED DESCRIPTION

Hereinafter, an exemplary embodiment will be described with reference to the drawings. The same constituent components and the same processes having the same functions are denoted by the same reference signs through all the drawings, and descriptions thereof will not be repeated.

First Exemplary Embodiment

Figure 1:
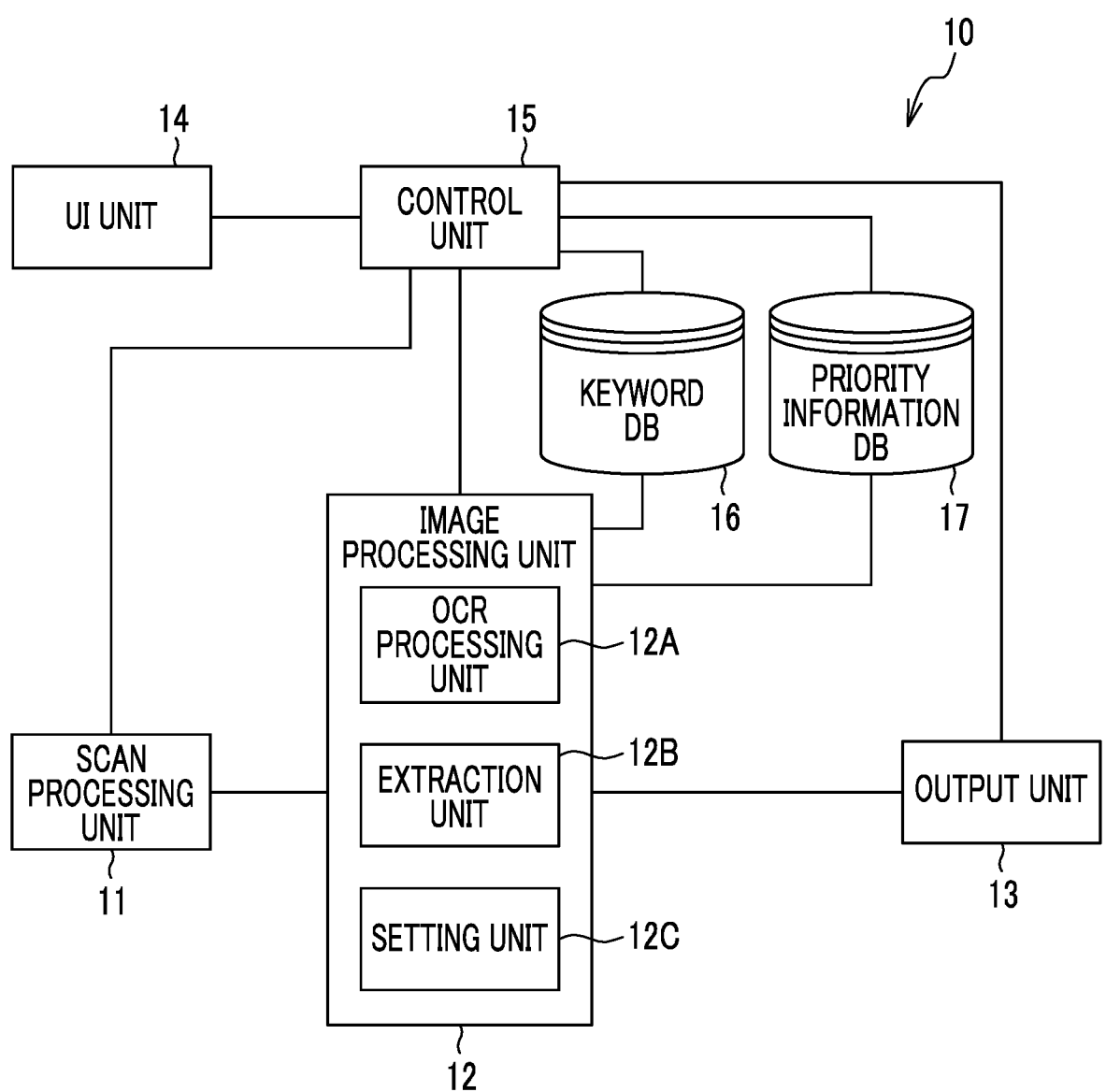
FIG. 1 is a block diagram illustrating an example of a functional configuration of an information processing apparatus.

FIG. 1 is a block diagram illustrating an example of a functional configuration of an information processing apparatus 10 that extracts a character string corresponding to a keyword of information on an acquisition target designated by a user, from a document subjected to, for example, OCR processing, and outputs the extracted character string.

The information processing apparatus 10 includes functional units, an extraction rule database (DB) 16, and a priority information DB 17. The functional units include a scan processing unit 11, an image processing unit 12, an output unit 13, a user interface (UI) unit 14, and a control unit 15.

The scan processing unit 11 generates an image (referred to as "a document image" below) corresponding to an original document, with a scanner unit 50 that optically reads the content written on the original document, and then transfers the generated image to the image processing unit 12.

The image processing unit 12 includes an OCR processing unit 12A, an extraction unit 12B, and a setting unit 12C.

The image processing unit 12 receives the document image from the scan processing unit 11. Firstly, the OCR processing unit 12A performs well-known image recognition of the document image and converts an image corresponding to a character in the document image into a character code. That is, the document image is handled as the character information, and copying and searching of a character are performed, by the OCR processing unit 12A. It is assumed that conversion data obtained by the OCR processing unit 12A converting the document image into the character information is referred to as "a document 20" below.

The extraction unit 12B extracts a character string corresponding to a keyword designated by a user, from the document 20 generated by the OCR processing unit 12A.

FIG. 2 is a diagram illustrating an example of the document 20 generated by the OCR processing unit 12A. Character strings in which various contents are described are included in the document 20. The format of the character string is not limited, and various formats are used. As described above, the format of the document 20 handled by the information processing apparatus 10 is not limited, and a document 20 having any format may be provided. However, it is possible to describe the technology in this disclosure in an easy-to-understand manner, in a case where descriptions are made on the assumption that the document 20 is limited to a document 20 having specific contents. Thus, for easy descriptions, a case where the document 20 is an estimate sheet received from another company will be described below as an example.

In a case where the user extracts desired information from the document 20, the information is extracted with reference to a keyword representing an item of the desired information.

For example, a case where it is considered that an estimate sheet is to be managed by extracting an estimate number from the estimate sheet, and the format of the estimate sheet is predetermined will be described. The estimate number is an identifier which is used for identifying the estimate sheet and is uniquely associated with the estimate sheet. In this case, the user finds out that the estimate number is described in the estimate sheet by a keyword of "the estimate number", for example. Thus, the information processing apparatus 10 sets "the estimate number" to a keyword object representing information on an acquisition target in accordance with an instruction of the user. Thus, the information processing apparatus 10 detects a character string of "the estimate number" from the estimate sheet and extracts the character string corresponding to the "estimate number" as the estimate number, from the estimate sheet. The keyword object representing an item of the information on the acquisition target is an example of "a target keyword" according to the technology in this disclosure.

The character string corresponding to the keyword object is a character string supposed to represent the content of the keyword object, for example, as with a character string in the same line in which the keyword object is provided. Such a character string is referred to as "a value" below. A direction and a degree of a character string being shifted from the keyword object in this direction, the character string being extracted as the value, are determined in accordance with a predetermined extraction rule of the value. Here, as an example, it is assumed that an extraction rule in which a character string to the right of the keyword object in the same line as a description line of the keyword object is set as the value is set. However, the extraction rule of the value may be changed.

In the above-described case, since the format of the estimate sheet received by the information processing apparatus 10 is set in advance, "the estimate number" is set as the keyword object representing desired information, in advance. However, in a case where plural types of estimate sheets received by the information processing apparatus 10 are provided, estimate numbers may be indicated by various notations. For example, in the example of the estimate sheet in FIG. 2, the estimate number is described as "an estimate sheet number". Further, among estimate sheets, an estimate sheet in which the "estimate number" is expressed, for example, by "No", "reference number", "Number", or "issue number" is provided.

As described above, a notation expressed for the estimate number in the estimate sheet is unknown. Thus, it is considered as follows. That is, variations in notation of a keyword representing information desired by the user, as with the estimate number, is registered in the keyword DB 16 in advance. For example, the information desired by the user is also extracted from a document 20 having a different creation source. Specifically, for example, each of "number", "estimate number", "No", "estimate sheet number", "reference number", "Number", and "issue number" for the estimate number is registered as a keyword representing the estimate number, in the keyword DB 16. As described above, a plurality of keywords registered, as keywords representing information desired by the user, in the keyword DB 16 in advance are referred to as "candidate keywords for the information". The candidate keywords including the plurality of keywords considered to represent information desired by the user are an example of "a keyword candidate" according to the technology in this disclosure.

The extraction unit 12B extracts a keyword included in the document 20 from the document 20 as a candidate keyword among the candidate keywords registered in the keyword DB 16, with reference to the keyword DB 16. Then, the extraction unit 12B transfers the extracted keyword to the setting unit 12C.

In a case where the setting unit 12C receives the candidate keyword from the extraction unit 12B, the setting unit 12C sets a keyword object among the received candidate keywords, in accordance with priority information 30 included in the priority information DB 17.

FIG. 3 is a diagram illustrating an example of the priority information 30 included in the priority information DB 17. For example, an information number, a condition, and a keyword are associated with the priority information 30.

The information number is an identifier for identifying the priority information 30, and a different number is set for each piece of the priority information 30.

The condition refers to information indicating a combination of candidate keywords included in the document 20. In a case where the type or the creation source of the document 20 differ, the format of the document 20 changes, and thus a combination of candidate keywords included in the document 20 also changes. A keyword representing another meaning, for example, a number (such as "No") different from the estimate number may be included, for example, in an estimate sheet of A Company, in addition to the keyword of "estimate sheet number" representing the estimate number. In addition, a keyword representing another meaning, for example, a number (such as "No" or "Number") different from the estimate number may be included, for example, in an estimate sheet of B Company, in addition to the keyword of "number" representing the estimate number.

Thus, the keyword indicates a keyword object among candidate keywords included in the condition of the priority information 30.

Since the candidate keyword included in the document 20 is set in the condition of the priority information 30 for each type or each creation source of the document 20, in advance, the origin and the format of the document 20 are specified. Specifically, the setting unit 12C sets priority information 30 in which a combination of keywords coincides with the combination of candidate keywords, which have been received from the extraction unit 12B is provided, as the priority information 30 proper for the document 20.

The setting unit 12C sets the keyword included in the proper priority information 30 as the keyword object of the document 20. For example, in a case where the document 20 illustrated in FIG. 2 is received, the candidate keywords of "No" and "estimate sheet number" are included in the document 20. Thus, the setting unit 12C sets priority information 30 having the information number of "2" and in which the same keywords as the received candidate keywords are set in the condition, as the priority information 30 proper for the document 20. The setting unit 12C sets "estimate sheet number" as the keyword object. The setting unit 12C notifies the extraction unit 12B of the set keyword object.

Thus, the extraction unit 12B extracts the value of the keyword object set by the setting unit 12C from the document 20 among the candidate keywords transferred to the setting unit 12C, in accordance with the extraction rule of the value. The extraction unit 12B transfers the keyword object and the value to the output unit 13.

In a case where the output unit 13 receives the value from the setting unit 12C in the image processing unit 12, the output unit 13 outputs the value associated with the keyword object. "Outputting the value" means being in a state where recognition of what kind of character string is the value extracted from the document 20 is possible. A target for recognizing the value is not limited to a person and may be a device. Thus, a case where the value associated with the keyword object is displayed in a display device, a case of being printed on a sheet, a case of being notified by sound, a case of being stored in a storage device, and a case of being transmitted from a communication unit 47 (described later) through a communication line (not illustrated) are forms of representing the output of the value.

The UI unit 14 receives an instruction from the user and notifies the user of various kinds of information of, for example, an operation and a state of the information processing apparatus 10. For example, the UI unit 14 receives an extraction instruction to extract desired information from the document 20 or a registration instruction to add, change, and delete the priority information 30 included in the priority information DB 17, from the user. The UI unit 14 notifies the user of the value corresponding to the keyword object. The UI unit 14 is an example of the receiving unit according to the exemplary embodiment.

The control unit 15 controls processing of each of the functional units including the scan processing unit 11, the image processing unit 12, the output unit 13, and the UI unit 14. In addition, the control unit 15 performs control of managing the keyword DB 16 and the priority information DB 17 in accordance with an instruction of the user. As described later in details, the control unit 15 generates new priority information 30 and adds the generated priority information 30 to the priority information DB 17, and thus is an example of a generation unit according to the exemplary embodiment.

Figure 4:
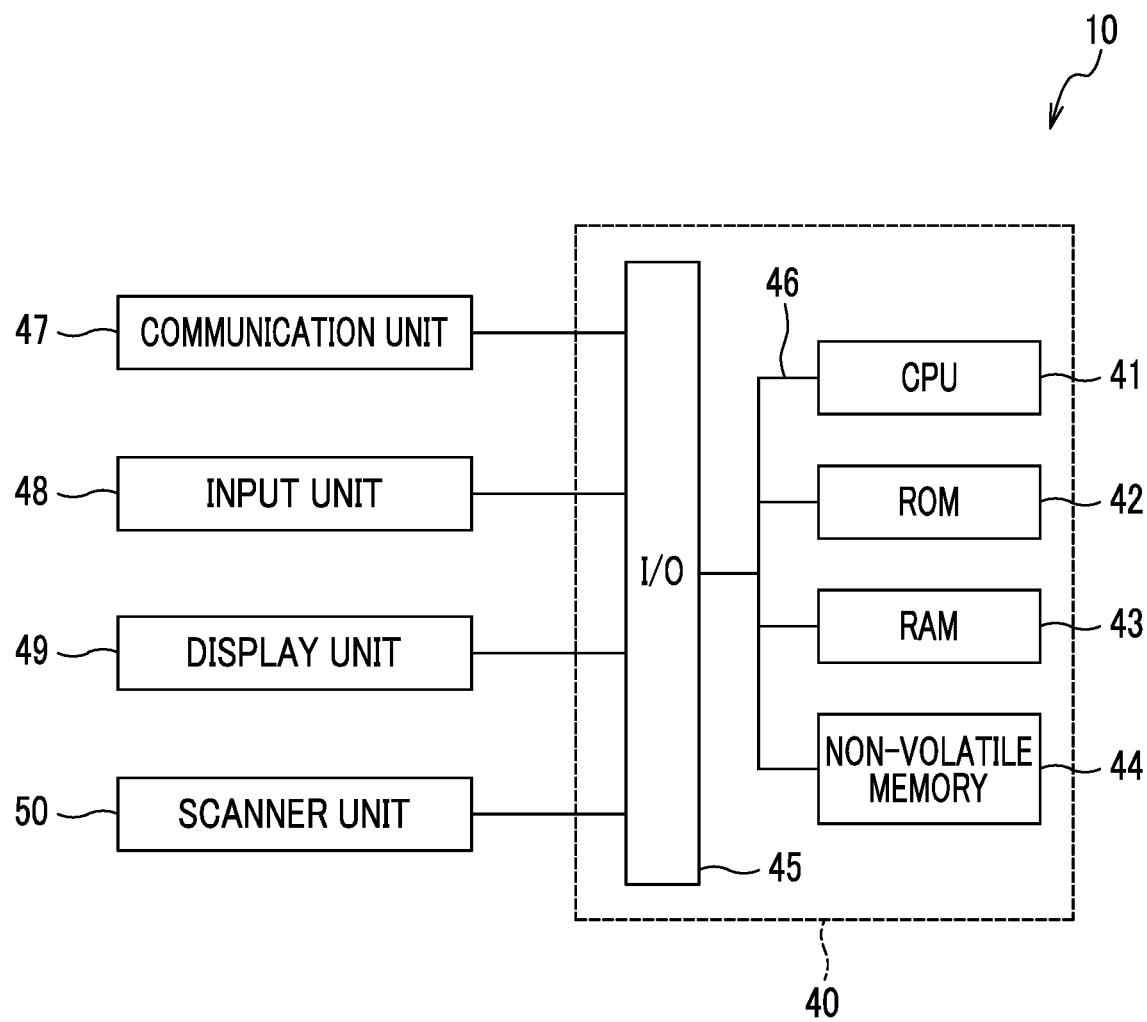
FIG. 4 is a diagram illustrating an example of a main configuration of an electric system in the information processing apparatus.

FIG. 4 is a diagram illustrating an example of the main configuration of an electric system in the information processing apparatus 10. The information processing apparatus 10 is configured with a computer 40, for example.

The computer 40 includes a central processing unit (CPU) 41 that handles the functional units according to the exemplary embodiment, a read only memory (ROM) 42 that stores an information processing program, a random access memory (RAM) 43 used as a temporary work area of the CPU 41, a non-volatile memory 44, and an input and output interface (I/O) 45. The CPU 41, the ROM 42, the RAM 43, the non-volatile memory 44, and the I/O 45 are connected to each other via a bus 46.

The non-volatile memory 44 is an example of a storage device in which stored information is maintained even though power supplied to the non-volatile memory 44 is cut off. As the non-volatile memory 44, for example, a semiconductor memory is used, but a hard disk may be used. The non-volatile memory 44 is not necessarily built in the computer 40, and may be a storage device such as a memory card, which is attachable to from the computer 40.

For example, the communication unit 47, an input unit 48, a display unit 49, and the scanner unit 50 are connected to the I/O 45.

The communication unit 47 is connected to a communication line (not illustrated) and includes a communication protocol for performing communication with a storage device and an external device (such as a computer) which are connected to a connection line (not illustrated).

The input unit 48 receives an instruction from the user and notifies the CPU 41 of the instruction. As the input unit 48, for example, buttons, a touch panel, a keyboard, and a mouse are used. The information processing apparatus 10 performs a function of which an instruction is received from the user with the input unit 48. The information processing apparatus 10 may receive the instruction from the user by sound. In this case, a microphone is connected to the I/O 45.

The display unit 49 is a device that displays information processed by the CPU 41, in a form of an image. For example, a liquid crystal display, an organic electro luminescence (EL) display, a projector for projecting an image on a screen, or the like is used.

The scanner unit 50 is a device that, for example, optically reads the content of an original document placed on platen glass (not illustrated) and converts the content of the original document into a document image, in accordance with an instruction of the CPU 41. The scanner unit 50 is used in processing of the scan processing unit 11.

In the information processing apparatus 10, the scan processing unit 11 receives the document image read by the scanner unit 50. However, it is not necessary that the scan processing unit 11 receives the document image from the scanner unit 50 connected to the I/O 45. For example, the information processing apparatus 10 may receive a document image read by a scanner device (not illustrated) connected to a communication line (not illustrated) through the communication unit 47. The information processing apparatus 10 may receive a document image stored in a cloud server.

The units connected to the I/O 45 are not limited to the units illustrated in FIG. 4. For example, an image forming unit that forms processed information on a recording medium in accordance with an instruction of the CPU 41 may be connected to the I/O 45.

In a case where the information processing apparatus 10 receives the document image through the communication unit 47 or a detachable semiconductor memory, the scanner unit 50 is not necessarily required. In this case, information equipment such as a desktop computer, a tablet computer, a smartphone, and a wearable computer, which includes an input and output device and a processing function of processing input information is used as the information processing apparatus 10. The input and output device provides an interface with a user.

Next, an operation of the information processing apparatus 10 that extracts information desired by the user from the document 20 will be described.

Figure 5:
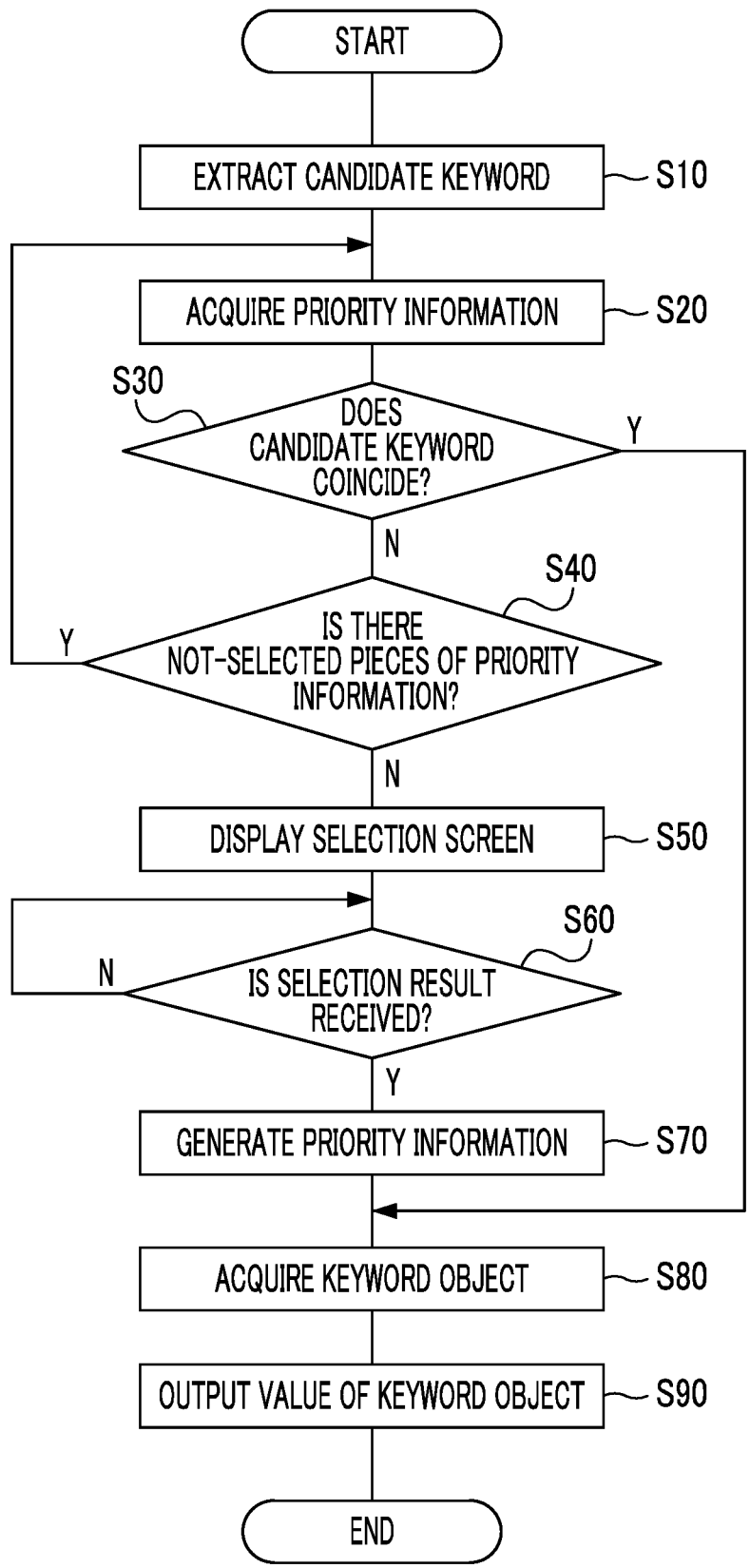
FIG. 5 is a flowchart illustrating an example of a flow of information processing according to a first exemplary embodiment.

FIG. 5 is a flowchart illustrating an example of a flow of information processing performed by the CPU 41 in a case where the image processing unit 12 receives a document image in accordance with an instruction of a user, and the OCR processing unit 12A converts the received document image into a document 20. The information processing program of defining information processing is stored, for example, in the ROM 42 of the information processing apparatus 10 in advance. The CPU 41 of the information processing apparatus 10 reads the information processing program stored in the ROM 42 to perform information processing.

A plurality of candidate keywords for the information desired by the user are registered in the keyword DB 16 in advance, in the information processing apparatus 10. At least one piece of priority information 30 is included in the priority information DB 17 in advance.

In Step S10, the CPU 41 extracts a candidate keyword included in the document 20 by using a candidate keyword which is registered in the keyword DB 16 in advance and represents the information desired by the user.

In Step S20, the CPU 41 acquires one piece of priority information 30 included in the priority information DB 17 with reference to the priority information DB 17.

In Step S30, the CPU 41 determines whether or not a combination of candidate keywords extracted from the document 20 in Step S10 coincides with a combination of candidate keywords included in the condition of the priority information 30 acquired in Step S20.

In a case where the combination of the extracted candidate keywords does not coincide with the combination of the included candidate keywords, it is considered that the priority information 30 acquired in Step S20 is not the received priority information 30 for the document 20. Thus, the process proceeds to Step S40.

In Step S40, the CPU 41 determines whether or not-selected pieces of priority information 30 are provided in the priority information DB 17. In a case where the not-selected pieces of priority information 30 are provided in the priority information DB 17 yet, the process proceeds to Step S20, and the CPU 41 acquires one piece of priority information 30 from the not-selected pieces of priority information 30 in Step S20. That is, the processes of Steps S20 to S40 repeat until it is determined that any not-selected piece of priority information 30 is not provided, by the determination process of Step S40. In the determination process of Step S30, the CPU 41 performs a process of searching for priority information 30 matching with the candidate keyword extracted from the document 20 in Step S10, from the priority information DB 17.

In a case where the priority information 30 matching with the candidate keyword extracted from the document 20 in Step S10 is not included in the priority information DB 17, the process proceeds to Step S50.

In this case, since the combination of the candidate keywords included in the document 20 is different from the combination of the candidate keywords set in the condition of any piece of priority information 30, it is considered that the received document 20 is a new document 20 which has not been received by the information processing apparatus 10 before. That is, the information processing apparatus 10 does not have a determination material for determining a candidate keyword being a keyword object among a plurality of candidate keywords included in the document 20.

Thus, in Step S50, the CPU 41 controls a selection screen 22 for causing the user to select the keyword object from the plurality of candidate keywords included in the document 20 to be displayed in the display unit 49, for example. A display destination of the selection screen 22 is not limited to the display unit 49. The CPU 41 may cause the selection screen 22 to be displayed in information equipment such as a smartphone via the communication unit 47, for example.

FIGS. 6A to 6C are diagrams illustrating display examples of the selection screen 22. FIG. 6A is a diagram illustrating an example of a document 20 in which proper priority information 30 is not provided in the priority information DB 17. FIG. 6B is a diagram illustrating the selection screen 22 displayed in a case where the document 20 in FIG. 6A is received.

The CPU 41 further extracts the value of each candidate keyword extracted from the document 20 in Step S10, from the document 20 in accordance with the extraction rule of the value. Then, the CPU 41 displays the value of each candidate keyword extracted from the document 20, on the selection screen 22 in association with the candidate keyword. For example, a selection item such as a radio button 24, which is used for selecting any one keyword of candidate keywords as the keyword object is displayed on the selection screen 22. Any one candidate keyword selected by the user with the selection item is set as the keyword object in the document 20.

In the example in FIG. 6B, a situation in which "reference number" is selected as the keyword object among the candidate keywords of "No" and "reference number" included in the document 20 illustrated in FIG. 6A is illustrated.

In Step S60, the CPU 41 determines whether or not the selection result of the keyword is received by the operation of the user on the selection screen 22. In a case where the selection result of the keyword is not received, the determination process of Step S60 repeats, and receiving the selection result is monitored. In a case where the selection result of the keyword is received, the process proceeds to Step S70.

In Step S70, the CPU 41 sets the candidate keyword extracted from the document 20 in Step S10, in the condition. The CPU 41 generates new priority information 30 in which a keyword indicated by the received selection result is set as the keyword object, and adds the generated priority information 30 to the priority information DB 17. FIG. 6C is a diagram illustrating an example of the priority information 30 generated based on the selection result of the selection screen 22 in FIG. 6B. In a case where the candidate keywords of "No" and "reference number" are extracted from the document 20 illustrated in FIG. 6A, and "reference number" is selected as the keyword object on the selection screen 22 illustrated in FIG. 6B, "No" and "reference number" are set in the condition, and priority information 30 having an information number of "3" in which "reference number" is set as the keyword is added to the priority information DB 17. The new priority information 30 added to the priority information DB 17 is set as the priority information 30 proper for the received document 20.

In a case where it is determined that the combination of the candidate keywords extracted from the document 20 in Step S10 coincides with the combination of the candidate keywords included in the condition of the priority information 30 acquired in Step S20, in the determination process of Step S30, that is, in a case where it is determined that the priority information 30 proper for the document 20 is provided in the priority information DB 17, or in a case where the new priority information 30 is generated in Step S70, the process proceeds to Step S80.

In Step S80, the CPU 41 acquires the keyword object from the priority information 30 proper for the document 20.

In Step S90, the CPU 41 extracts the value of the keyword object acquired in Step S80 from the document 20, with reference to the extraction rule of the value, and outputs the extracted value along with the keyword object, for example. In a case where the priority information 30 proper for the document 20 is not provided, and the selection screen 22 is displayed in Step S50, the value associated with the candidate keyword selected as the keyword object by the user acts as the value of the keyword object. Thus, the value may not be extracted from the document 20 again. With such processes, the information processing illustrated in FIG. 5 ends.

The document 20 received by the information processing apparatus 10 is not limited to a document 20 divided into pages. For example, a document 20 such as a spreadsheet used in a spreadsheet application, which is not managed in a page unit, may be provided. In a case where the document 20 received by the information processing apparatus 10 is the document 20 divided into pages, the number of pages of the received document 20 is not limited. A document 20 including one page or a document 20 including a plurality of pages may be provided.

Even in a case where a document 20 is configured, for example, by a document 20 of A company and a document 20 of B company subsequent to the document 20 of A company, that is, the document 20 is configured by a plurality of documents 20 having different formats is provided, priority information 30 proper for each of the documents 20 having different formats is obtained from the combination of the candidate keywords included in the document 20. Thus, even in a case where the notation of the keyword representing information desired by the user differs depending on the creation source of the document 20, the value of the information desired by the user is obtained.

In a case of documents 20 having the same type or documents 20 created by the same creation source, the formats of the document 20 have commonality such as a case where the same symbol, for example, "■ estimate number" is added ahead of the candidate keywords. Thus, for example, a range of the document 20 created by the same creation source in the document 20 including documents 20 created by a plurality of creation sources is determined by the degree of changing the formats of the documents 20. Information of determining the range of the document 20 of each creation source is also obtained based on creation source information and a page number described in the header or the footer of the document 20 and on whether or not a title described only on the first page of the document.

Further, in a case where the number of pages of the document 20 is known for each of documents 20 having different creation sources from each other, the range of the document 20 is determined for each creation source by the number of pages.

As described above, according to the information processing apparatus 10 according to the exemplary embodiment, a plurality of candidate keywords representing information desired by a user are set in advance, and priority information 30 including the candidate keyword coinciding with a candidate keyword extracted from a document 20 is selected as priority information 30 proper for the document 20. In this state, the information processing apparatus 10 sets a keyword of the priority information 30 proper for the document 20 as a keyword object, extracts a value corresponding to the keyword object from the document 20, and outputs the value along with the keyword object. Only the extracted value may be output without a need to output the value extracted from the document 20 along with the keyword object.

Second Exemplary Embodiment

In the first exemplary embodiment, the information processing apparatus 10 that selects the priority information 30 proper for a document 20 based on a combination of candidate keywords included in the document 20 is described. However, among documents 20, there is a document 20 which has the same combination of candidate keywords included in the document 20, but has a different creation source or a different type from others. In a case where the creation source or the type of the document 20 is different from others, a keyword object representing information desired by a user may be different from others even though the combination of the candidate keywords included in the document 20 is the same as others.

Considering such circumstances, although the combination of the candidate keywords included in the document 20 coincides with a combination of candidate keywords included in priority information 30, a keyword included in the priority information 30 may not necessarily represent a correct keyword object of the document 20.

Thus, in this exemplary embodiment, an information processing apparatus 10 that selects priority information 30 proper for a document 20 with accuracy higher than accuracy in a case where the priority information 30 proper for the document 20 is selected from the combination of the candidate keywords included in the document 20 will be described.

Figure 7:
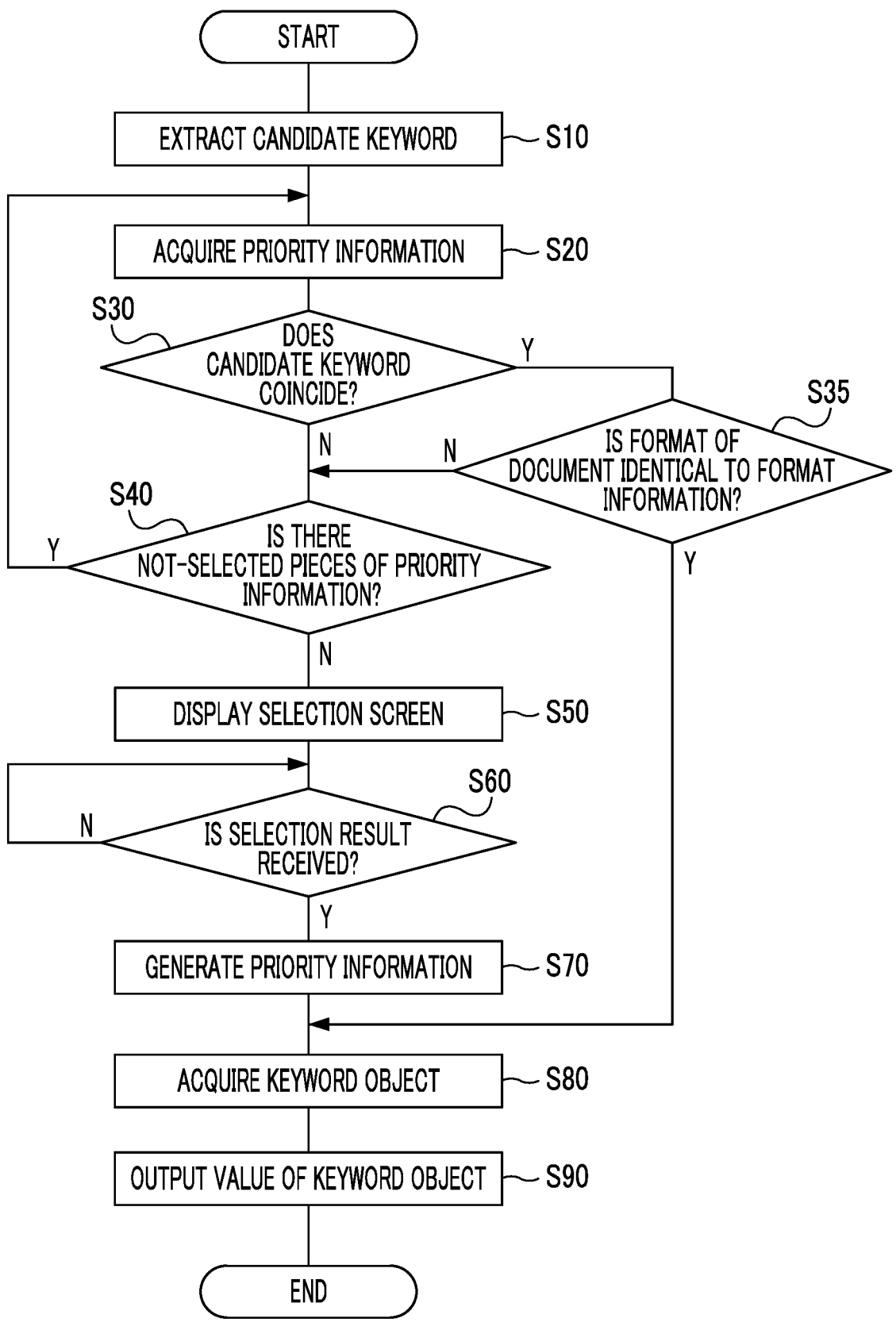
FIG. 7 is a flowchart illustrating an example of a flow of information processing according to a second exemplary embodiment.

FIG. 7 is a flowchart illustrating an example of a flow of information processing performed by the CPU 41 in a case where the image processing unit 12 receives a document image in accordance with an instruction of a user, and the OCR processing unit 12A converts the received document image into a document 20. The information processing program of defining information processing is stored, for example, in the ROM 42 of the information processing apparatus 10 in advance. The CPU 41 of the information processing apparatus 10 reads the information processing program stored in the ROM 42 to perform information processing.

The information processing illustrated in FIG. 7 is different from the information processing according to the first exemplary embodiment illustrated in FIG. 5 in that Step S35 is added. Other processes are the same.

A plurality of candidate keywords for the information desired by the user are registered in the keyword DB 16 in advance, in the information processing apparatus 10. At least one piece of priority information 30 is included in the priority information DB 17 in advance.

In a case where it is determined that a combination of candidate keywords extracted from the document 20 in Step S10 coincides with a combination of candidate keywords included in the condition of the priority information 30 acquired in Step S20, in Step S30, Step S35 is performed.

In Step S35, the CPU 41 determines whether or not the format of the document 20 is identical to format information set in the condition of the priority information 30, with reference to the priority information 30 acquired in Step S20.

Figures 8, 9:
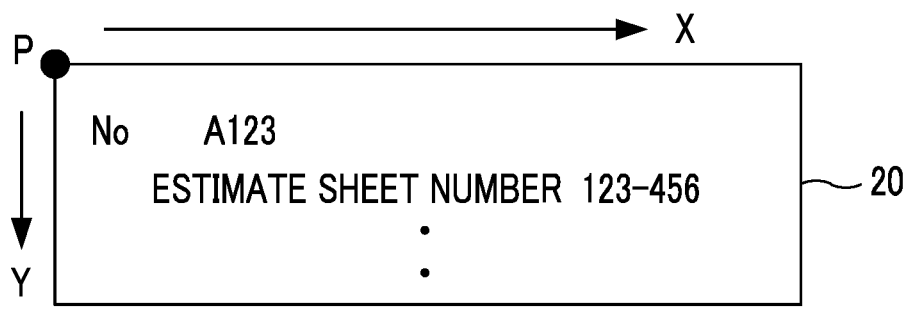
FIG. 8 is a diagram illustrating an example of priority information used in the information processing according to the second exemplary embodiment.
FIG. 9 is a diagram illustrating another example of the document.

FIG. 8 is a diagram illustrating an example of the priority information 30 according to the exemplary embodiment. The format information of the document 20 is set in advance in the condition of the priority information 30 according to the exemplary embodiment, in addition to the candidate keyword. Ina case of the priority information 30 in FIG. 8, a description position of the candidate keyword in the document 20 is set as the format information of the document 20. The description position of the candidate keyword is set by a format of [x, y, w, h], for example.

"x", "y", "w", and "h" are integers of 0 or more. "x" indicates a coordinate value of a candidate keyword in a two-dimensional coordinate system (XY coordinate system) set in advance in a page of the document 20, in an X-axis direction. "y" indicates a coordinate value of the candidate keyword in the XY coordinate system in a Y-axis direction. An origin P of the XY coordinate system may be set in anyplace on the page. As an example, a top left vertex is set as the origin P, and a direction from the origin P along a line direction of the document 20 is set as the X-axis direction, and a direction perpendicular to the X-axis direction is set as the Y-axis direction.

For example, in a case where a candidate keyword is surrounded by a rectangle (referred to as "an inclusive rectangle") having a size as small as possible, the coordinate value of the candidate keyword in the X-axis direction corresponds to a coordinate value of a top left vertex of the inclusive rectangle in the X-axis direction. The coordinate value of the candidate keyword in the Y-axis direction corresponds to a coordinate value of the op left vertex of the inclusive rectangle in the Y-axis direction. Setting the coordinate values of the candidate keyword in the X-axis direction and the Y-axis direction is not limited to the above example. For example, any place may be set for the coordinate values of the candidate keyword in the X-axis direction and the Y-axis direction so long as the place having coordinates which are uniquely set in accordance with the description position of the candidate keyword, for example, a coordinate value of a center point of a region in which the candidate keyword is described is provided.

"w" indicates the width of the candidate keyword in the XY coordinate system. "h" indicates the height of the candidate keyword in the XY coordinate system. The width of the candidate keyword is set, for example, to the length of the inclusive rectangle surrounding the candidate keyword in the X-axis direction. The height of the candidate keyword is set, for example, to the length of the inclusive rectangle surrounding the candidate keyword in the Y-axis direction. Defining the width and the height of the candidate keyword may not be limited so long as the values of the width and the height are uniquely set depending on the size of the description region of the candidate keyword.

In a case where the document 20 is a new document 20 which has not been received by the information processing apparatus 10, new priority information 30 is generated in Step S70 in FIG. 7. However, in a case where the CPU 41 generates the new priority information 30, the CPU 41 sets the description position of the candidate keyword in the document 20, in the condition of the new priority information 30 in association with the candidate keyword. In this case, the CPU 41 may display the description position of the candidate keyword on the selection screen 22.

The user recognizes the description position of the candidate keyword displayed on the selection screen 22, and, as necessary, corrects the description position of the candidate keyword. In a case where the description position of the candidate keyword is corrected, the CPU 41 registers the corrected description position of the candidate keyword, in the priority information 30.

In a case of priority information 30 represented by the information number of "3" in FIG. 8, the description position of [10, 10, 15, 10] is set for a candidate keyword of "No", and the description position of [40, 25, 40, 10] is set for a candidate keyword of "estimate sheet number".

FIG. 9 is a diagram illustrating an example of a document 20 corresponding to the priority information 30 represented by the information number of "3" in FIG. 8.

In a case of priority information 30 represented by the information number of "2" in FIG. 8, the description position of [10, 10, 15, 10] is set for a candidate keyword of "No", and the description position of [10, 25, 40, 10] is set for a candidate keyword of "estimate sheet number". This priority information 30 corresponds to the document 20 illustrated in FIG. 2.

As described above, the description position of the candidate keyword is set in the priority information 30 illustrated in FIG. 8. Thus, even though the document 20 illustrated in FIG. 2 and the document 20 illustrated in FIG. 9 include "No" and "estimate sheet number" being the same candidate keywords together, the document 20 illustrated in FIG. 2 is determined to be identical to format information of the priority information 30 represented by the information number of "2" in FIG. 8, and is determined not to be identical to format information of the priority information 30 represented by the information number of "3" in FIG. 8, due to a difference of the description position of the candidate keyword. On the contrary, the document 20 illustrated in FIG. 9 is determined to be identical to the format information of the priority information 30 represented by the information number of "3" in FIG. 8, and is determined not to be identical to the format information of the priority information 30 represented by the information number of "2" in FIG. 8.

In a case where it is determined that the format of the document 20 is not identical to format information set in the condition of the priority information 30 acquired in Step S20, in the determination process of Step S35, the process proceeds to Step S40. In a case where it is determined that a not-selected piece of priority information 30 is provided, in Step S40, new priority information 30 is acquired in Step S20. Thus, in a case where new priority information 30 having a candidate keyword which coincides with the candidate keyword included in the document 20 is provided, the format of the document 20 and the format information set in the condition of the new priority information 30 are compared to each other in Step S35.

In a case where it is determined that the format of the document 20 is identical to the description position set in the condition of the priority information 30 acquired in Step S20, in the determination process of Step S35, this priority information 30 means priority information 30 proper for the document 20. Thus, the process proceeds to Step S80.

In Step S80, a keyword object is acquired from the priority information 30 which is proper for the document 20 and has determination that the combination of the candidate keywords coincides, and the description position of the candidate keyword is the same.

"The description position being the same" includes a situation where the description position of a character string as a comparison target of the description position, in the document 20 is included in a predetermined range from the description position set in the condition of the priority information 30, in addition to a case where the description position of the character string as the comparison target of the description position coincides with the description position set in the condition of the priority information 30. "The predetermined range" is set to a range in which selection accuracy of the priority information 30 is not decreased even though the description position is determined to be the same so long as a difference from the description position set in the condition of the priority information 30 is within the predetermined range.

In the information processing illustrated in FIG. 7, a case where the format information set in the condition of the priority information 30 is the description position of the candidate keyword in the document 20 is described. However, the format information set in the condition of the priority information 30 is not limited to the description position of the candidate keyword. As the format information set in the condition of the priority information 30, any piece of information may be provided so long as the information is used for determining the type or the creation source of the document 20. For example, the description position of the value of the candidate keyword in the document 20 may be used as the format information set in the condition of the priority information 30.

In a case where the priority information 30 proper for the document 20 is selected based on the description position of the character string in the document 20, the description position of a character string in the document 20 may be different from the description position of the character string in the actual original document. For example, in a case where an original document is disposed to be shifted from a range of the original document being to be read in a case where the scanner unit 50 reads the original document, the description position of a character string in the read document 20 is different from the description position in the actual original document even though the character string in the read document is the same as the character string in the actual original document.

Figure 10:
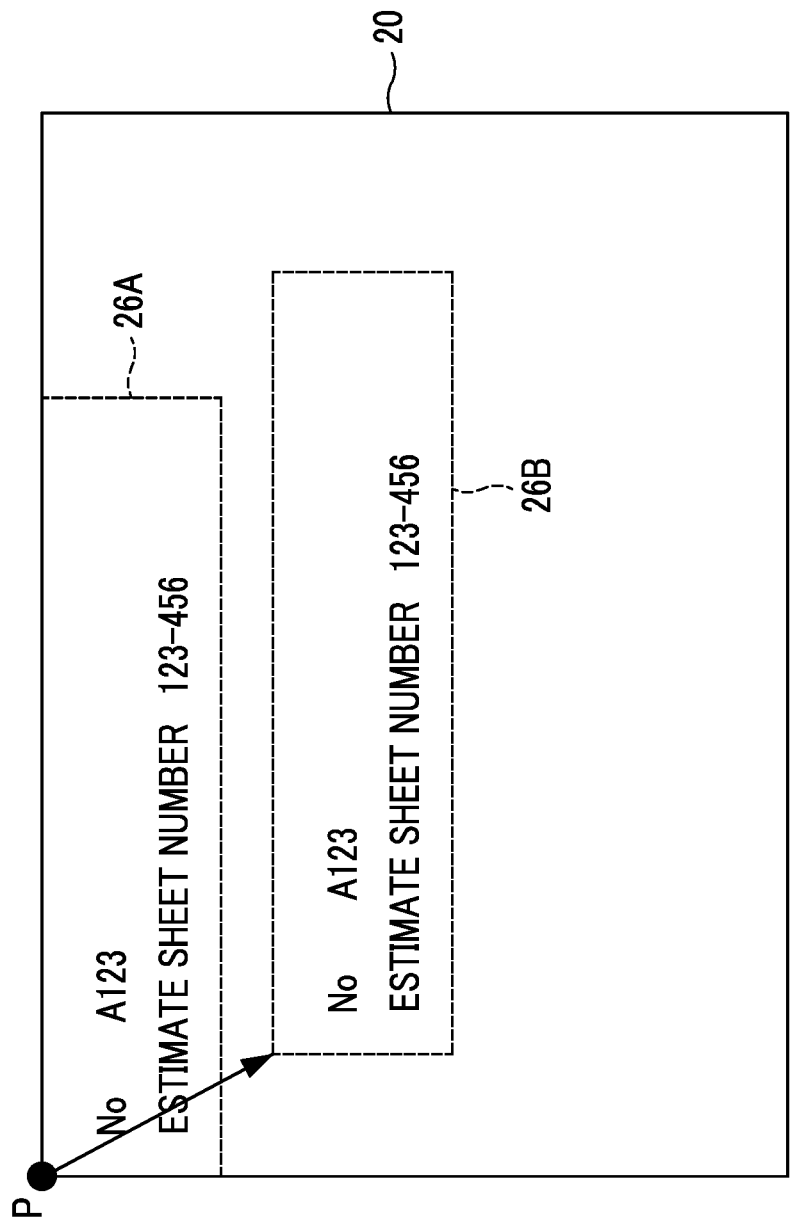
FIG. 10 is a diagram illustration a shift of a description position of a character string in the document.

FIG. 10 is a diagram illustrating a shift of the description position of a character string in the document 20 due to a shift of disposing an original document in the scanner unit 50.

In a case where an original document is placed on a platen glass (not illustrated) such that a corner (upper left corner in the example in FIG. 10) of the original document coincides with a reference point of the range in which the scanner unit 50 reads the original document, the origin P of the document 20 and the corner of the original document are at the same position. Thus, as illustrated in FIG. 10, the description position of a character string in the document 20 is the same as the description position of the character string in the original document (see a region 26A). However, in a case where the corner of the original document is disposed to be shifted from the reference point of the range in which the scanner unit 50 reads the original document, the position of the origin P of the document 20 is different from the position of the corner of the original document. Thus, the description position of the character string in the document 20 is different from the description position of the character string in a case where the corner of the original document is aligned to the reference point of the range in which the original document is read (see a region 26B).

That is, in a case where the description position of the candidate keyword set in the condition in the priority information 30 is expressed by coordinates (referred to as "absolute coordinates") using the origin P of the document 20 as the reference, even though the priority information 30 is originally proper for the document 20, the priority information 30 may be determined not to be the priority information 30 proper for the document 20 by the disposition of the original document in the scanner unit 50.

Thus, in a case where the candidate keyword or the description position of the value of the candidate keyword is set in the priority information 30, a relative position using the position of any one character string included in the document 20 as a reference point may be used. The reference point of the relative position is set to a relative reference point.

As an example, in a case where the top left vertex of the inclusive rectangle of the candidate keyword of "No" is set to the relative reference point, the description position of "No" in the document 20 illustrated in FIG. 9 is expressed, for example, by [0, 0, 15, 10], and the description position of "estimate sheet number" is expressed, for example, by [30, 15, 40, 10]. Even though the corner of the original document is disposed to be shifted from the reference point of the region in which the scanner unit 50 reads the original document, and, as a result, the description position of the candidate keyword in the document 20 is shifted to the position of the region 26B in FIG. 10, the description position of the candidate keyword, which is viewed from the relative reference point, does not change because the relative reference point of the candidate keyword is shifted in the same manner. Accordingly, even though the document 20 is a document 20 in which the corner of the original document is disposed to be shifted from the reference point of the region in which the scanner unit 50 reads the original document, the priority information 30 proper for the document 20 is correctly selected in comparison to a case where the description position of the candidate keyword is set in the priority information 30 by the absolute coordinates.

The format information set in the condition of the priority information 30 is not limited to the description position of the character string in the document 20. For example, the character attribute of the candidate keyword or the character attribute of the value of the candidate keyword may be set in the format information.

"The character attribute" is a collection of elements that define the appearance of a character in the document 20. For example, elements of defining the character attributes include the size of a character, the font of the character, the thickness of the character, the decoration of the character, and the color of the character.

"The decoration of a character" means that the outline of the character is modified in a range in which the original meaning of the text can be read or that another element is added to the character. For example, a character in italics and a character to which an underline, a strikethrough, a side point, or shading is applied are examples of a decorated character.

A space between character strings or a space between characters is also included in the character attribute because of defining the appearance of the character. For example, in a case where documents 20 are different from each other, a candidate keyword and a space between values corresponding to candidate keywords may be different. Thus, the space between character strings may be used in the format information. In a case where documents 20 are different from each other, a candidate keyword and a delimiter (for example, space and character such as ":" and "=") for delimiting values corresponding to candidate keywords may be different. Thus, the type of delimiter may be used in the format information.

FIGS. 11A to 11C are diagrams situations in a case where a character attribute is used in format information set for the priority information 30.

A document 20 illustrated in FIG. 11A is different from a document 20 illustrated in FIG. 11B. However, the notation and the description position of a candidate keyword included in the documents 20 are the same between the documents 20. The document 20 in FIG. 11A has a format in which a value of a candidate keyword is underlined. The document 20 in FIG. 11B has a format in which the candidate keyword is underlined. FIG. 11C illustrates an example of priority information 30.

In the priority information 30 in FIG. 11C, "Value" indicates the value, and "Key" indicates the candidate keyword. "Under" indicates being underlined. Format information of the document 20 having a format, for example, in which the values of candidate keywords of "No" and "estimate sheet number" are underlined is set in the condition of the priority information 30 indicated by the information number of "1". Thus, the priority information 30 indicated by the information number of "1" is selected as the priority information 30 proper for the document 20 in FIG. 11A.

Format information of the document 20 having a format, for example, in which the candidate keywords of "No" and "estimate sheet number" are underlined is set in the condition of the priority information 30 indicated by the information number of "2". Thus, the priority information 30 indicated by the information number of "2" is selected as the priority information 30 proper for the document 20 in FIG. 11B.

Regarding the size of the character, in a case where the size of the character, for example, [Key size=10] is set in the condition of the priority information 30 in association with the candidate keyword, priority information 30 in which format information of a document 20 having a format in which the size of the character of the candidate keyword is 10 points is set is proper for the document. Regarding the font of the character, in a case where the font of the character, for example, [Key font=Mincho type] is set in the condition of the priority information 30 in association with the candidate keyword, priority information 30 in which format information of a document 20 having a format in which the font of the character of the candidate keyword is the Mincho type is set is proper for the document. In this manner, other character attributes may be set in the priority information 30.

Since the character attribute is used in the format information set in the condition of the priority information 30, priority information 30 proper for each document 20 is selected even though documents 20 having the same combination of candidate keywords included in the documents 20 are provided.

Hitherto, although the present invention has been described above using the exemplary embodiment, the present invention is not limited to the scope described in the exemplary embodiment. Various changes or modifications can be added to the exemplary embodiment without departing from the scope of the present invention, and a form to which the changes or improvements are added is also included in the technical scope of the present invention. For example, the order of processing may be changed without departing from the scope of the present invention.

In the exemplary embodiment, a form in which the information processing is realized by software has been described as an example. However, processing equivalent to the flowcharts illustrated in FIGS. 5 and 7 is implemented in, for example, an application specific integrated circuit (ASIC) and may be performed by hardware. In this case, a processing speed can be increased in comparison to a processing speed in a case where the information processing is realized by software.

Further, instead of realizing each functional unit, the keyword DB 16, and the priority information DB 17 illustrated in FIG. 1 by the single information processing apparatus 10, processing equivalent to the processing of the information processing apparatus 10 may be executed by being distributed and arranged in a plurality of information devices using cloud computing, and linking the plurality of information devices to each other.

In the above-described exemplary embodiment, a form in which the information processing program is installed in the ROM 42 is described. However, it is not limited thereto. The information processing program according to the exemplary embodiment of the present invention can also be provided in a form of being recorded in a computer-readable storage medium. For example, the information processing program according to the exemplary embodiment of the present invention may be provided in a form of being recorded on an optical disc such as a compact disc (CD)-ROM or a digital versatile disc (DVD)-ROM. The information processing program according to the exemplary embodiment of the present invention may be provided in a form of being recorded in a semiconductor memory such as a universal serial bus (USB) memory and a flash memory. Further, the information processing apparatus 10 may acquire the information processing program according to the exemplary embodiment of the present invention from an external device connected to a communication line (not illustrated) via the communication unit 47.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
acquire a document image which represents a scanned paper document, the document image having text data that is a result of character recognition processing;
in a case where a plurality of keyword candidates including a target keyword of one keyword are included in the text data, each of the plurality of keyword candidates having a corresponded character string, decide one of the plurality of keyword candidates according to priority information as a decided keyword candidate;
extract a character string corresponding to the decided keyword candidate; and
output the extracted character string as a keyword value of the document image.

2. The information processing apparatus according to claim 1,
wherein, in a case where the document image is configured by a plurality of document images having different formats,
the processor is configured to set the target keyword for each of the document images having different formats, in accordance with the priority information.

3. The information processing apparatus according to claim 2,
wherein format information of each document image is associated with the priority information, and
in a case where specific format information associated with any piece of the priority information is applied for the format of the document image, the processor is configured to set the target keyword among the keyword candidates, in accordance with the priority information associated with the specific format information.

4. The information processing apparatus according to claim 3, wherein the format information associated with the priority information is indicated by a character attribute of a character string representing the decided keyword candidate or a character attribute of a character string corresponding to the decided keyword candidate.

5. The information processing apparatus according to claim 4, wherein the processor is configured to receive a selection result obtained by selecting any one keyword from the decided keyword candidates, wherein, in a case where the priority information matching with the decided keyword candidate included in the document image is not provided, the processor is configured to set a keyword indicated by the selection result received by the receiving unit, as the target keyword among the decided keyword candidates.

6. The information processing apparatus according to claim 3, wherein the format information associated with the priority information is indicated by a description position of the decided keyword candidate in the document image.

7. The information processing apparatus according to claim 6, wherein the description position of the decided keyword candidate or a description position of a character string corresponding to the decided keyword candidate is indicated by a relative position with respect to a position of any one of the decided keyword candidates.

8. The information processing apparatus according to claim 7, wherein the processor is configured to receive a selection result obtained by selecting any one keyword from the decided keyword candidates, wherein, in a case where the priority information matching with the decided keyword candidate included in the document image is not provided, the processor is configured to set a keyword indicated by the selection result received by the receiving unit, as the target keyword among the decided keyword candidates.

9. The information processing apparatus according to claim 6, wherein the processor is configured to receive a selection result obtained by selecting any one keyword from the decided keyword candidates, wherein, in a case where the priority information matching with the decided keyword candidate included in the document image is not provided, the processor is configured to set a keyword indicated by the selection result received by the receiving unit, as the target keyword among the decided keyword candidates.

10. The information processing apparatus according to claim 3, wherein the format information associated with the priority information is indicated by a description position of a character string corresponding to the decided keyword candidate in the document image.

11. The information processing apparatus according to claim 10, wherein a description position of the decided keyword candidate or the description position of a character string corresponding to the decided keyword candidate is indicated by a relative position with respect to a position of any one of the decided keyword candidates.

12. The information processing apparatus according to claim 11, wherein the processor is configured to receive a selection result obtained by selecting any one keyword from the decided keyword candidates, wherein, in a case where the priority information matching with the decided keyword candidate included in the document image is not provided, the processor is configured to set a keyword indicated by the selection result received by the receiving unit, as the target keyword among the decided keyword candidates.

13. The information processing apparatus according to claim 10, wherein the processor is configured to receive a selection result obtained by selecting any one keyword from the decided keyword candidates, wherein, in a case where the priority information matching with the decided keyword candidate included in the document image is not provided, the processor is configured to set a keyword indicated by the selection result received by the receiving unit, as the target keyword among the decided keyword candidates.

14. The information processing apparatus according to claim 3, further comprising:
the processor is configured to receive a selection result obtained by selecting any one keyword from the keyword candidates,
wherein, in a case where the priority information matching with the keyword candidate included in the document image is not provided, the processor is configured to set a keyword indicated by the selection result that is received, as the target keyword among the keyword candidates.

15. The information processing apparatus according to claim 14,
wherein the processor is configured to generate new priority information for each of the keyword candidates which do not match with any piece of the priority information, in accordance with the selection result.

16. The information processing apparatus according to claim 2, wherein the processor is configured to receive a selection result obtained by selecting any one keyword from the keyword candidates, wherein, in a case where the priority information matching with the keyword candidate included in the document image is not provided, the processor is configured to set a keyword indicated by the selection result that is received, as the target keyword among the keyword candidates.

17. The information processing apparatus according to claim 16, wherein the processor is configured to generate new priority information for each of the keyword candidates which do not match with any piece of the priority information, in accordance with the selection result.

18. An information processing apparatus comprising:

a processor configured to in a case where a plurality of keyword candidates representing information on an acquisition target are included in a document, set a target keyword from the keyword candidates in accordance with priority information of defining a keyword to be preferentially used as the target keyword representing an item of the information on the acquisition target among the keyword candidates;

extract a character string corresponding to the set target keyword, from the document;

output the extracted character string corresponding to the extracted target keyword; and receive a selection result obtained by selecting any one keyword from the keyword candidates, wherein, as the priority information included in the document is not matched with the keyword candidate, a keyword indicated by the selection result that is received is set as the target keyword among the keyword candidates.

19. The information processing apparatus according to claim 18, wherein the processor is configured to generate new priority information for each of the keyword candidates which do not match with any piece of the priority information, in accordance with the selection result.

20. A non-transitory computer readable medium storing an information processing program causing a computer to:

acquire a document image which represents a scanned paper document, the document image having text data that is a result of character recognition processing;

in a case where a plurality of keyword candidates including a target keyword of one keyword are included in the text data, each of the plurality of keyword candidates having a corresponded character string, decide one of the plurality of keyword candidates according to priority information as a decided keyword candidate;

extract a character string corresponding to the decided keyword candidate; and output the extracted character string as a keyword value of the document image.

21. An information processing apparatus comprising:

a processor configured to in a case where a plurality of keyword candidates representing information on an acquisition target are included in a document, set a target keyword from the keyword candidates in accordance with priority information of defining a keyword to be preferentially used as the target keyword representing an item of the information on the acquisition target among the keyword candidates, wherein an information number, a condition, and a keyword are associated with the priority information;

extract a character string corresponding to the target keyword which is set, from the document; and output the character string corresponding to the target keyword, which is extracted, wherein the information number is an identifier for identifying the priority information, and a different number is set for each piece of the priority information, the condition refers to information indicating a combination of candidate keywords included in the document, the keyword indicates a keyword object among candidate keywords included in the condition of the priority information.

22. A non-transitory computer readable medium storing an information processing program causing a computer to:

in a case where a plurality of keyword candidates representing information on an acquisition target are included in a document, set a target keyword from the keyword candidates in accordance with priority information of defining a keyword to be preferentially used as the target keyword representing an item of the information on the acquisition target among the keyword candidates, wherein an information number, a condition, and a keyword are associated with the priority information;

extract a character string corresponding to the target keyword which is set, from the document; and output the character string corresponding to the target keyword, which is extracted, wherein the information number is an identifier for identifying the priority information, and a different number is set for each piece of the priority information, the condition refers to information indicating a combination of candidate keywords included in the document, the keyword indicates a keyword object among candidate keywords included in the condition of the priority information.

* * * * *